(12) United States Patent
Ikeuchi et al.

(10) Patent No.: US 7,949,179 B2
(45) Date of Patent: May 24, 2011

(54) SHAPE MEASUREMENT DEVICE AND METHOD THEREOF

(75) Inventors: Katsushi Ikeuchi, Kanagawa (JP); Kazuhide Hasegawa, Tokyo (JP); Tomohito Masuda, Tokyo (JP)

(73) Assignees: The University of Tokyo, Bunkyo-ku, Tokyo; Japan Science and Technology Agency, Kawaguchi-shi, Saitama ( * ) Notice: Subject to any disclaimer, the term of this patent is extended or adjusted under 35 U.S.C. 154(b) by 1024 days.

(21) Appl. No.: 10/598,010

(22) PCT Filed: Sep. 15, 2004

(86) PCT No.: PCT/JP2004/013419
§ 371 (c)(1),
(2), (4) Date: May 2, 2007

(87) PCT Pub. No.: WO2005/080914
PCT Pub. Date: Sep. 1, 2005

(65) Prior Publication Data
US 2007/0266574 A1   Nov. 22, 2007

(30) Foreign Application Priority Data
Feb. 25, 2004   (JP) .................... 2004-050029

(51) Int. Cl.
*G06K 9/46* (2006.01)
*A61B 5/103* (2006.01)
*G01R 19/00* (2006.01)
(52) U.S. Cl. ...... 382/154; 382/190; 600/595; 324/76.11
(58) Field of Classification Search .......... 382/154, 382/190, 170, 218; 345/419, 424; 600/493, 600/554, 595, 300; 374/E1.005, E1.002; 324/76.11, 76.19
See application file for complete search history.

(56) References Cited

U.S. PATENT DOCUMENTS
4,915,498 A * 4/1990 Malek .................. 356/5.04
(Continued)

FOREIGN PATENT DOCUMENTS
JP         09184720        7/1997
(Continued)

OTHER PUBLICATIONS
Hirota, Yuichiro, et al. "Shape Reformation of 3D Range Image Scanned on a Balloon", The 21st Annual Conference of the Robotics Society of Japan, Sep. 20, 2003.*

(Continued)

*Primary Examiner* — Sheela C Chawan
(74) *Attorney, Agent, or Firm* — Sheldon Mak & Anderson; Jeffrey G. Sheldon

(57) ABSTRACT

The present invention is a system for determining the three dimensional shape of an object, having a first measuring means for measuring a first distance and direction from a fixed first observation point to a first group of measurement points on an object, and a second measuring means for measuring a second distance and direction from a movable second observation point to a second group of measurement points on the aforementioned object, at least one point among said second group of measurement points being the same measurement point as at least one point among the aforementioned first group of measurement points, and said second group of measurement points including at least one measurement point not included in the aforementioned first group of measurement points, and further being provided with a calculating means for calculating the traveling velocity vector of the second observation point from the measurement results concerning the aforementioned same measurement point due to the first and second measuring means, correcting the aforementioned second measurement results based upon said traveling velocity vector, and calculating the three dimensional coordinates of the measurement points of the first group and the second group, and a displaying means that displays an image of the object based upon the aforementioned three dimensional coordinates.

17 Claims, 9 Drawing Sheets

U.S. PATENT DOCUMENTS

| | | | | |
|---|---|---|---|---|
| 5,311,999 | A | * | 5/1994 | Malow et al. ................ 209/583 |
| 5,538,138 | A | * | 7/1996 | Reich ............................ 209/3.3 |
| 5,737,438 | A | * | 4/1998 | Zlotnick et al. .............. 382/101 |
| 6,144,451 | A | * | 11/2000 | Kawabata ..................... 356/624 |
| 6,639,594 | B2 | * | 10/2003 | Zhang et al. ................. 345/426 |
| 6,879,946 | B2 | * | 4/2005 | Rong et al. ....................... 703/2 |
| 6,897,946 | B2 | * | 5/2005 | Uomori et al. ................ 356/3.1 |
| 7,343,039 | B2 | * | 3/2008 | Liu et al. ....................... 382/170 |

FOREIGN PATENT DOCUMENTS

| JP | 11238136 A | 8/1999 |
|---|---|---|
| JP | 200005032 | 3/2000 |
| JP | 2002090456 | 3/2002 |

OTHER PUBLICATIONS

Hirota, Yuichiro, et al. "Shape Reformation of 3D Range Image Scanned on a Balloon", The 21st Annual Conference of the Robotics Society of Japan, Sep. 20, 2003.

PCT Notification of Transmittal of Translation of the International Preliminary Report on Patentability.

* cited by examiner

SHAPE MEASUREMENT DEVICE AND METHOD THEREOF

CROSS-REFERENCE TO RELATED APPLICATIONS

This application is the national stage of, and claims the benefit of priority from, International Application Number PCT/JP2004/013419, filed on Sep. 15, 2004 and titled "Shape Measurement Device and Method Thereof," which claims the benefit of priority from Japanese Patent Application Number 2004-050029, filed on Feb. 25, 2004 and titled "Shape Measurement Device and Method Thereof." Each of these applications is incorporated herein in its entirety by reference.

TECHNICAL FIELD

The present invention concerns a system for measuring the shape of an object and a method thereof, and concretely concerns, for example, a system for determining the three dimensional shape of an object by measuring an object from the ground and additionally performing a measurement from above with a flying range sensor, and matching the measurement results thereof, and the like.

BACKGROUND ART

In recent years, research concerning the reconstruction of a measured object as an image by utilizing computer graphics technology, by using three dimensional measurement data (range image) obtained from highly accurate laser range sensors has been carried out.

In normal three dimensional shape measuring, laser range sensors are installed on the ground, and scanning is performed from multiple directions so that the object to be measured can be measured exhaustively. However, in cases where the object to be measured and its surrounding environment is, for example, a large building, the measurement range of the laser range sensor will be limited to the surface regions that can be observed from the sensor, so that points that are beyond the measurable range of the sensor, or points that are occluded, will exist. For example, unmeasured region 15 and the like in FIG. 1, indicated by slanted lines, corresponds to such points, so that measuring from the ground only will be insufficient.

In the conventional art, in order to overcome this problem, measuring is generally done by building a scaffold that is higher than the portion that cannot be observed due to being blocked, and installing a laser range sensor on top of the scaffold. Whereby, it becomes possible to perform the measurement of the aforementioned unmeasured region 15 in FIG. 1, but said method presupposes that there are no problems in the state of the ground on which the scaffold is to be built, and a scaffold can be safely constructed. Further, as the shape of the observed object becomes more complex, measurement from many different viewpoints becomes necessary, and reconstructing a scaffold and installing a range sensor each time requires a large amount of labor and cost.

Non-Patent Document 1: K. Nishino and K. Ikeuchi: Robust simultaneous registration of multiple range images. Proceedings of the 5th Asian Conference on Computer Vision, Vol. 2, pp. 455-461, (2002)

Non-Patent Document 2: T. Masuda: 3d shape restoration and comparison through simultaneous registration. Master's thesis, Graduate School of Information Science and Technology, University of Tokyo, (2003)

Non-Patent Document 3: Mark D. Wheeler: Automatic Modeling and Localization for Object Recognition. PhD thesis, School of Computer Science, Carnegie Mellon University, (1996)

Non-Patent Document 4: E. Polak: Computational Methods in Optimization. New York: Academic Press, (1971)

Non-Patent Document 5: David A. H. Jacobs: The States of the Art in Numerical Analysis. London; Academic Press, (1977)

Non-Patent Document 6: J. Stoer and R. Bulirsch: Introduction to Numerical Analysis. New York; Springer-Verlag, (1980)

DISCLOSURE OF THE INVENTION

Problem to be Solved by the Invention

In order to measure the shape of a large building for which some portions cannot be observed from the ground, measurement from high points is indispensable. As mentioned above, constructing scaffolds and performing measurements requires a large amount of time and labor. Further, in cases where scaffolds cannot be constructed, separate measurement by having a person climb to the unmeasured region and the like becomes necessary but these methods require manpower and time. Further, it is inappropriate to have a person climb some objects. Additionally, when measuring by hand, measurements cannot be done with a similar degree of precision as with a range laser sensor.

In order to solve these problems, the present invention presents a system and method for performing shape measurement of a large building or the like easily and speedily, without the need for a scaffold, and for which measurement from a high place is possible while changing the viewpoint freely.

Means for Solving the Problem

According to the system and method according to the present invention, by measuring an object from an observation point set up above, in conjunction with measuring from a fixed point set up on the ground, the coordinates of the entire object can be calculated from these measurement results. In the present invention in particular, it is not necessary for the overhead observation point to be a fixed point, and it can be, for example, a laser range sensor attached to a balloon. In cases where the sensor is attached to a balloon, the problem arises that the position of the sensor changes due to the influence of the wind, so the image becomes distorted. Therefore, in the present invention, during alignment of the distorted range image obtained by the overhead measurement device and the undistortedrange image obtained from a fixed point on the ground, a method is used whereby correction is performed by simultaneously considering the shape distortion represented by parameters. Since the coordinates and the traveling velocity of the overhead observation point can be calculated from the measurement results, there is no need for them to be known in advance.

According to one preferred embodiment of the present invention, the system for identifying the three dimensional shape of an object based upon the present invention has a first measuring means for measuring a first distance and direction from a fixed first observation point to a first group of measurement points on the object, and a second measuring means for measuring a second distance and direction from a movable second observation point to a second group of measurement points on the aforementioned object, at least one of said second group of measurement points being the same measurement point as at least one of the aforementioned first group of measurement points, and said second group of measurement points including at least one measurement point not included in the aforementioned first group of measurement points, and further being provided with a calculating means that calculates the traveling velocity vector of the second observation point from measurement results concerning the aforementioned same measurement point due to the first and second measuring means, corrects the aforementioned second measurement result based upon said traveling velocity vector, and calculates the three dimensional coordinates of the first group and the second group of measurement points, and a displaying means for displaying an image of the object based upon the aforementioned three dimensional coordinates.

For example, when reproducing the shape of a cultural site such as a large building and the like as a three dimensional image utilizing a laser range sensor, if the distance to the shape surface of the cultural site is measured from a viewpoint on the ground, there are cases where regions that are blind spots of the measurement scan are created. In such cases, it is necessary to measure the shape of the cultural site including the aforementioned blind spot region from a different viewpoint, and in particular it is desirable to be able to perform measurements from various angles above the cultural site. In order to satisfy this requirement, for example, if measurement of the cultural site is performed over a wide area from all angles by affixing a laser range sensor to a balloon, it is possible to perform measurements regardless of the terrain surrounding the cultural site, so that the labor required for setting up the laser range sensor can be reduced.

According to the system based on the present invention, since measurement of the same measurement point is performed from both a fixed first observation point and a movable second observation point, first, the traveling velocity of the movable second observation point can be calculated based upon this measurement result. Next, it is possible to capture the entire image of the object by correcting the measurement results of the second observation point by using this calculated traveling velocity.

According to a preferred embodiment of the present invention, the aforementioned second measuring means is provided with a scanner unit comprising a laser radar unit for ranging each point, a four-faceted polygon mirror for performing horizontal scanning, and a planar swing mirror for performing vertical scanning.

One thing demanded of the flying laser range sensor in the second measuring means of the present invention is that it be possible to perform measurements at high speed in order to reduce any influence due to the movement of the balloon. The measurement time for a normal range laser sensor is approximately two minutes at the fastest, and when the movement of the balloon is considered, measurements done while suspended from a balloon are not realistic. Therefore, by utilizing the high speed scanning of a polygon mirror, and by slightly reducing the measurement density in the vertical direction, high-speed measurement becomes possible. It is possible to compensate for the low measurement density by performing measurements multiple times from the same viewpoint.

According to a preferred embodiment of the present invention, the aforementioned second measuring means is provided with a controller unit that internally houses a radar unit control portion, control portions for two mirrors, and an interface portion for sending measurement results to a measurement computer.

The second measuring means, in order to control the aforementioned scanner unit, is provided with a controller unit that internally houses a scanner for obtaining a three dimensional image, a control portion for controlling the aforementioned four-faceted polygon mirror and the aforementioned planar swing mirror, and an interface portion to a computer that processes measurement data, whereby the laser range sensor can be oriented with the measurement range indicated by the control instructions as the target.

According to a preferred embodiment of the present invention, the aforementioned second measuring means is provided with a recording medium, it being possible to save measurement results to said recording medium, and further, is provided with a computer whereby the aforementioned scanner unit and the control unit are controllable.

If a computer is provided with the system of the present invention, it can gather measurement data by controlling the aforementioned scanner unit and the aforementioned controller unit, and obtained data can be recorded and stored by passing said gathered data through the aforementioned interface portion into an internal or external recording medium.

According to a preferred embodiment of the present invention, the measurement result from the second observation point is corrected by determining, by the conjugate gradient method, the velocity vector at which the error in the three dimensional coordinates is minimized, using the measurement results concerning the aforementioned same measurement point due to the first and the second measuring means, with the assumption that the traveling velocity vector of the aforementioned second observation point is time-independent. For example, minimization of the following equation is done by the conjugate gradient method.

[Equation 3]

$$E(p) = \frac{1}{N(M-1)} \sum_{i}^{N} \sum_{j}^{M} \rho(z_{ij}(p))$$

where $$p = (m, q)$$

$$z_{ij}(p) = \|R(q)g(v)i + m - y_{ij}\|^2$$

$$\rho(z_{ij}(p)) = \log\left(1 + \frac{1}{2}z_{ij}i(p)^2\right)$$

N: number of points of measured data
M: number of measured data
Here,
E(p) is an error function defined as the weighted average of the $\rho(z_{ij}(p))$'s using the M estimation method with a Lorentzian function.

$$z_{ij}(p) = |R(q)g(v)_i + m - y_{ij}|^2$$

is the distance between corresponding points in the measurement results of the first and the second measuring means.

m is the translational motion vector.
$y_{ij}$ is the corresponding point in the jth measured image.
p is a parameter group comprising the translational motion vector m and a quaternion q that represents rotation.
R(q) is a function of the quaternion q that represents rotation.
g(v)i is a parameter for shape distortion due to uniform velocity motion.

According to a preferred embodiment of the present invention, measured points from the aforementioned second group that are not included in the aforementioned first group of measured points are corrected for by using m', where said m' is the R(q) g(v)$_i$+m that minimizes z$_{ij}$(p).

For example, when the software that runs on the computer automatically performs alignment of the three dimensional image of a cultural site whereof the shape is identified from gathered data obtained by the aforementioned second measuring means (second image), and the three dimensional image obtained by the aforementioned first measuring means (first image), even if distortion of the measurement results occurs due to environmental influences on the balloon wherefrom the second measuring means is suspended, such as wind, processing can be done to correct for this and optimize.

In the present invention, if the image data obtained from the first measuring means, which is the baseline image, is, for example, obtained from a viewpoint on the ground, it is conceivable that when reproducing a cultural site such as a large building, an unmeasured region which the laser range sensor cannot reach can be created. Additionally, a second measuring means that performs measurements from above obtains image data by measuring the overall shape of the cultural site including the aforementioned unmeasured region. Alignment is performed by repeated calculation so that the distance between corresponding points in a region where the image data from the first measuring means and the second measuring means overlap is minimized. In the present invention the aforementioned distance between the corresponding points is defined as $z_{ij}(p)=|R(q) g(v)_i+m-y_{ij}|^2$, and this is minimized by the conjugate gradient method. The determination of the unmeasured region that was not measured by the first measuring means is performed by simultaneously estimating the distortion parameters of the aforementioned unmeasured region measured by the second measuring means based upon the minimal distance between the aforementioned corresponding points. In this way, alignment of the first and second images is performed.

A preferred embodiment of the present invention is a method for identifying the three dimensional shape of an object, having a first measuring procedure for measuring a first distance and direction from a fixed first observation point to a first group of measurement points on the object,
and a second measuring procedure for measuring a second distance and direction from a movable second observation point to a second group of measurement points on the aforementioned object,
at least one of said second group of measurement points being the same measurement point as at least one of the aforementioned first group of measurement points, and said second group of measurement points including at least one measurement point not included in the aforementioned first group of measurement points,
and further having a procedure for calculating the traveling velocity vector of the second observation point from measurement results concerning the aforementioned same measurement point due to the first and second measuring means,
and a procedure for calculating the three dimensional coordinates of the first group and the second group of measurement points by correcting the aforementioned second measurement results based upon said traveling velocity vector.

For example, in the present invention, as a method for identifying the shape of large objects, a first measuring means such as a laser range sensor measures the distance to the target object surface in order to create a first image that is the baseline image, and then the second measuring means measures the distance to the target object surface from above in order to create a second image. By aligning said two images, the two images can be determined. By performing distance measurement from above, problems that arise when constructing a scaffold for setting up a measurement device as mentioned above, can be overcome.

According to a preferred embodiment of the present invention, the aforementioned procedure for measuring the second distance and direction is carried out by a scanner unit comprising a laser radar unit for ranging each point, a four-faceted polygon mirror for performing horizontal scanning, and a planar swing mirror for performing vertical scanning.

The scanner unit provided in the second measuring means obtains range image data with a laser from above on the surface of a large cultural site. Said scanner realizes a method to perform high speed scanning with a polygon mirror in the horizontal direction in the abovementioned constitution, and high speed scanning due to a reduction in measuring density in the vertical direction. Said reduction in said measurement density can be compensated for by performing multiple measurements from the same viewpoint.

According to a preferred embodiment of the present invention, the aforementioned procedure for measuring the second distance and direction includes a procedure for sending measurement results to a measuring computer through an interface.

As a method provided in the second measuring means, for example, data from measuring a large cultural site is obtained over a wide area by controlling a rangefinder and the aforementioned two mirrors, and in order to save said obtained data, for example, a method for sending this to a computer provided with a recording medium can be utilized.

According to a preferred embodiment of the present invention, the aforementioned procedure for measuring the second distance and direction includes a procedure for saving measurement results to a recording medium, and a procedure for controlling a scanner unit and control unit with a computer.

As a method provided in the aforementioned second measuring means, a method can be utilized where, for example, data that is measured and controlled by the scanner unit and controller unit is saved in a recording medium provided in a computer, and the aforementioned measuring and controlling is directed by a computer.

According to a preferred embodiment of the present invention, a procedure is included whereby the measurement result from the second observation point is corrected for by determining, by the conjugate gradient method, the velocity vector at which the error in the three dimensional coordinates is minimized, using the measurement results concerning the aforementioned same measurement point due to the first and the second measuring means, with the assumption that the traveling velocity vector of the aforementioned second observation point is time-independent.

According to a preferred embodiment of the present invention, in the aforementioned correction method, the translational motion vector that minimizes the following equation due to the conjugate gradient method is determined.

[Equation 4]

$$E(p) = \frac{1}{N(M-1)} \sum_i^N \sum_j^M \rho(z_{ij}(p))$$

where

-continued $$p = (m, q)$$

$$z_{ij}(p) = \|R(q)g(v)i + m - y_{ij}\|^2$$

$$\rho(z_{ij}(p)) = \log\left(1 + \frac{1}{2}z_{ij}i(p)^2\right)$$

N: number of points of measured data
M: number of measured data
Here,
E(p) is an error function defined as the weighted average of $\rho(z_{ij}(p))$ using the M estimation method with a Lorentzian function.

$$z_{ij}(p) = |R(q)g(v)_i + m - y_{ij}|^2$$

is the distance between corresponding points in the measurement results of the first and the second measuring means.
m is the translational motion vector.
$y_{ij}$ is the corresponding point in the jth measured image.
p is a parameter group comprising the translational motion vector m and a quaternion q that represents rotation.
R(q) is a function of the quaternion q that represents rotation.
$g(v)i$ is a parameter for shape deformation due to uniform velocity motion.

According to the correction method of the present invention, the aforementioned second group of measured points that are not included in the aforementioned first group of measured points are corrected by using m', where said m' is R(q) $g(v)_i$+m that minimizes $z_{ij}(p)$.

If the alignment of the first image and the second image in the method for identifying the target object shape according to the present invention is considered, if, for example, the first image is created based upon data measured from a viewpoint on the ground, then if the measured object is large, then depending upon its shape, there is the possibility that unmeasured regions may arise. The unmeasured region is not displayed within the first image, but since the second image is, for example, measured from above from a point fixed to a balloon or the like, the entire shape of a cultural site including the aforementioned unmeasured region can be measured. However, since the balloon is affected by natural phenomena such as wind, the measuring position of the measuring means is not fixed, so a distortion in the actually measured data of the second image is created. Therefore, since an error due to distortion arises in the alignment between the first image and the second image, an estimation method for correcting for this and matching up corresponding points becomes necessary.

The estimation method according to the present invention, in order to estimate the distortion parameters simultaneously with the conventional alignment processing, as mentioned above, the aforementioned distance between corresponding points is defined as $z_{ij}(p)=|R(q) g(v)_i+m-y_{ij}|^2$, and a method is used whereby the error between the regions actually measured in the aforementioned first image and the second image is minimized using the conjugate gradient method. For the unmeasured regions, by using the minimized m', the unmeasured region in the aforementioned first image can be specified by $y_{ij}$-m', based upon the actually measured data of the second image.

According to a preferred embodiment of the present invention, the distance measuring system that measures the distance and direction from a movably fixed observation point according to the present invention to a measurement point on the aforementioned object is provided with a scanner unit comprising a laser radar unit for ranging a single point, a four-faceted polygon mirror for performing horizontal scanning, and a planar swing mirror for performing vertical scanning, a controller unit having internally a radar control unit portion, two mirror control portions, and an interface portion that sends measurement results to a measuring computer, and a computer being provided with a recording medium and in which measurement results can be saved in said recording medium, and further, that can control the aforementioned scanner unit and control unit.

For example, in order to scan the shape of a large cultural site from above, from a point fixed to a balloon, it is necessary to create a small and lightweight unit in consideration of the balloon's lift, and it is demanded that, in order not to be affected by natural phenomena such as wind, measuring can be done at high speed. The present invention is provided with a scanner unit having a constitution as above that can measure one frame in one second, as desired, a controller unit that can control the movement of the scanner unit within the range of the measuring region, and a computer for saving measurement data, and controlling the scanner unit and the control unit.

BEST MODE OF THE INVENTION

Figure 1:
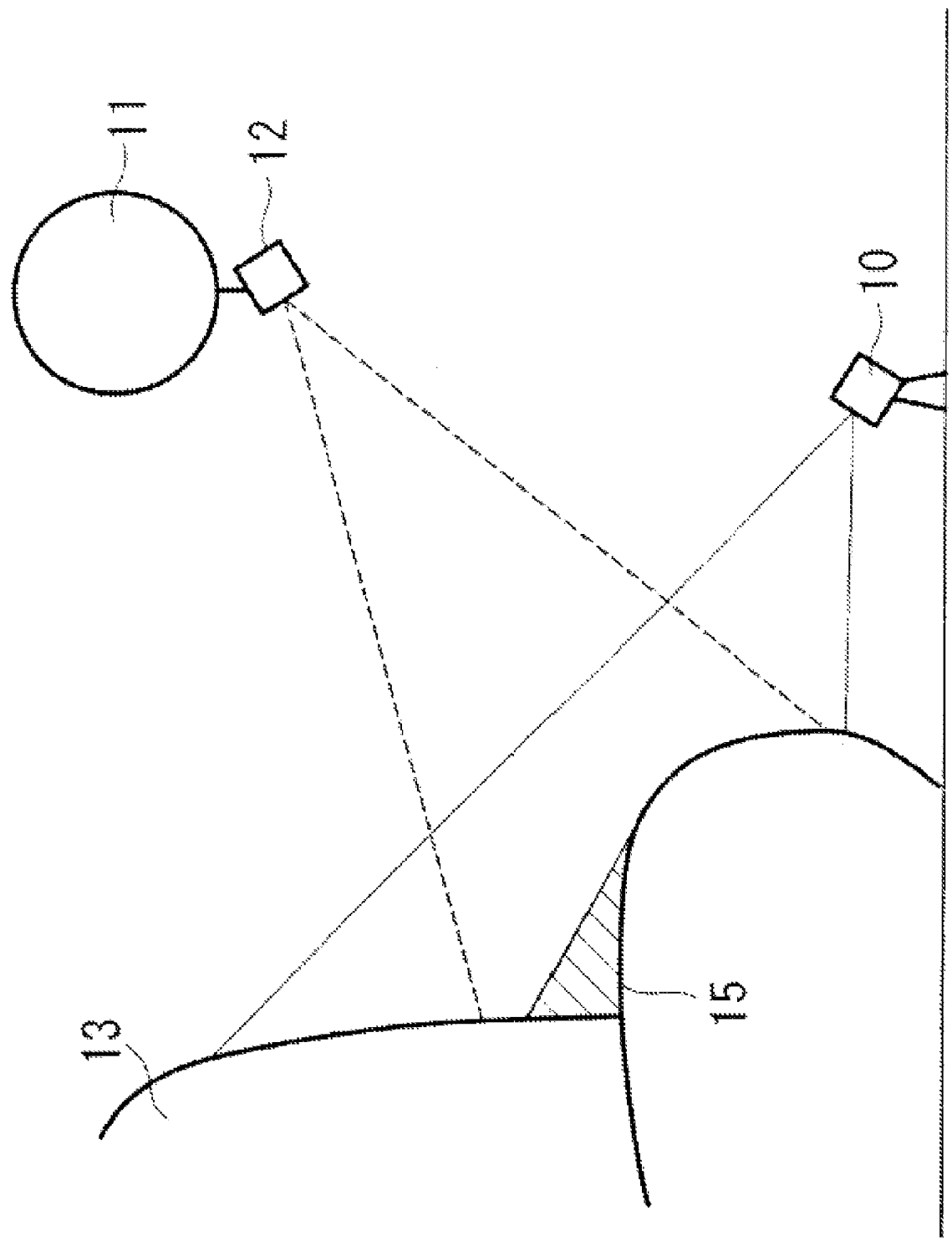
FIG. 1 is a conceptual diagram showing the measuring of the shape of a target object according to the present invention.

FIG. 1 is an overall schematic diagram of a three dimensional measuring system using a flying range sensor in order to reproduce the shape of a large object, according to the present invention. A measuring device 10 set up on the ground has the function of obtaining data for generating range images, and is a first measuring system for generating a baseline image that reproduces the shape of a measured target object 13 three dimensionally by gathering data from multiple measuring points. A measuring device 12 suspended from a balloon 11, being provided with a ranging portion, a ranging region control portion that indicates the ranging direction, and a computer wherein is provided a medium whereon ranging data is storable, has the function of obtaining data for generating a range image, and is a second measuring system for generating an image that reproduces the shape of a measured target object 13 three dimensionally based upon measurement data from above.

As can be seen from FIG. 1, in the first measuring system, an unmeasured region 15 is created that is not measured due to the shape of the measured target object. Said unmeasured region 15 is recognized as an undisplayed region during reproduction as a three dimensional image by computer processing, and said three dimensional image is the baseline image (first image).

In the second measuring system, since measurement is done from above, the measuring device 12 can obtain ranging data for the entirety of the measured target object 13 including the aforementioned unmeasured region 15. Next, these data can be displayed as three dimensional images (second images) by computer processing.

Figure 2:
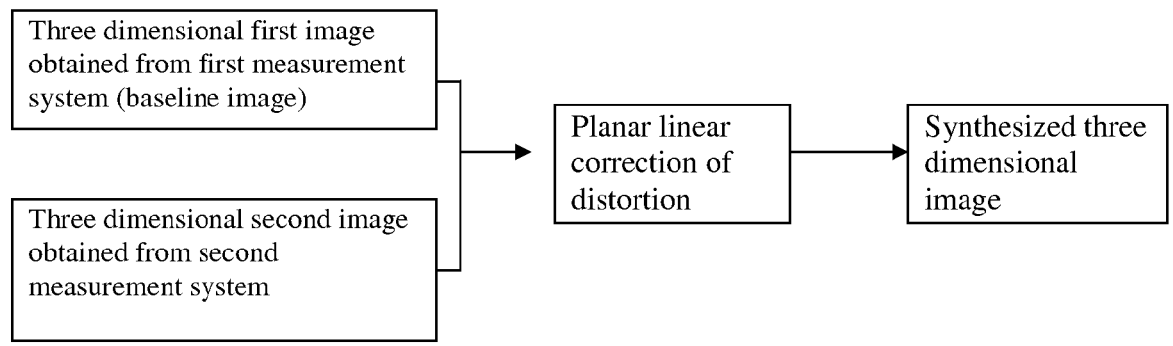
FIG. 2 shows a flowchart of the image alignment according to the present invention.

Normally, in order to reproduce a three dimensional image by computer processing from ranging data from the surface of a target object 13, alignment is performed between a baseline image (first image in the present invention) and a measured image (second image in the present invention). However, in the case of the present invention, since it can be thought that in the second measuring system, the balloon may be affected by the environment such as wind, and distortion in the obtained image may result, a method is utilized wherein the movement of the balloon in the air is indicated by parameters, and when alignment is done of portions of the measured data measured from a balloon and undistorted data measured from the ground that overlap, the distortion is simultaneously corrected. In order to explain the above, a flowchart of a method according to the present invention wherein the alignment of the first image and the second image is performed is shown in FIG. 2.

For the flying range sensor in the second measuring system, although among range sensors based upon triangulation (active stereo), there are systems which can perform measurements in approximately 0.3 seconds, due to the properties of triangulation, there are the following problems, so that for large scale measurement outdoors, the laser radar format is considered to be practical:
1. It is necessary to lengthen the baseline in order to do measurements of long distances, so it is ill-suited for large scale measurement.
2. For long-distance use, it is necessary to increase the power of the laser, so it is dangerous.
3. Due to limitations of the light receptor elements, it is not suited for measurements in bright environments.

However, the measuring time for a normal laser range sensor is approximately two minutes even for a fast one, and if the movement of a balloon is taken into consideration, using one suspended from a balloon is unrealistic. Therefore, in the present invention, by slightly reducing the measuring density in the vertical direction by utilizing high-speed scanning with a polygon mirror, high-speed measuring with a measuring time of one second was realized.

Figure 6:
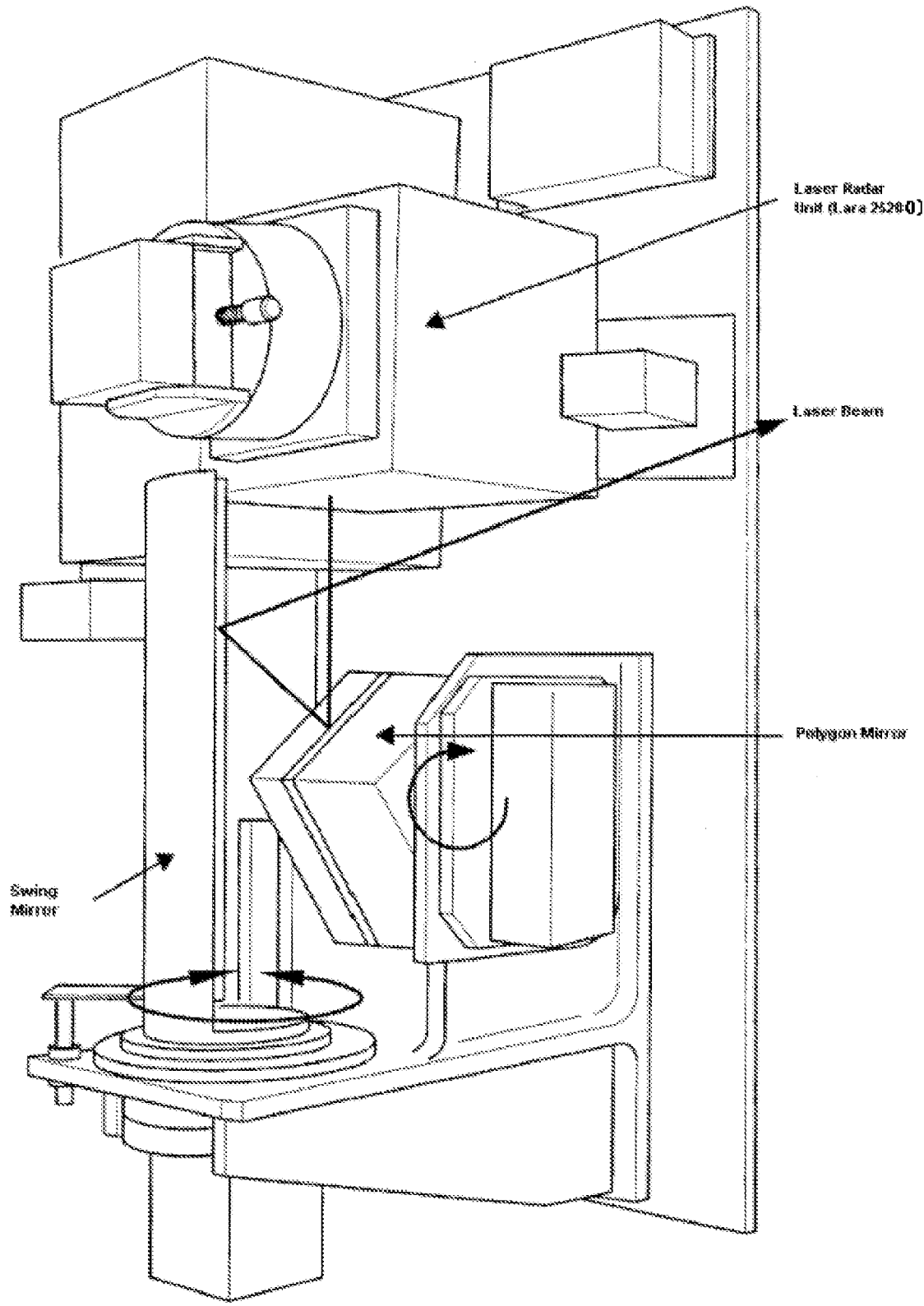
FIG. 6 is an internal block diagram of the scanner unit according to the present invention.

For the second measuring system according to the present invention, in consideration of the conditions required for carrying it on a balloon, it must be small and lightweight in accordance with the lift of the balloon, and measurements must be performed at high speed in order to reduce the effects of the movements of the balloon, so a scanner unit having the internal constitution shown in FIG. 6 will be carried. For details, refer to the experimental data for the following estimation method for actually measured data. Additionally, an explanation of the operating principles shall be omitted, since this is a well-known measuring device.

Regarding the Alignment Method

In non-patent document 1, for normal position and attitude matching, the error function E(p) is set as follows, and E(p) is minimized using the steepest gradient method.

[Equation 5]

$$E(p) = \frac{1}{N(M-1)} \sum_{i}^{N} \sum_{j}^{M} \rho(z_{ij}(p)) \qquad (1)$$

where $$p = (m, q)$$
$$z_{ij}(p) = \|R(q)x_i + m - y_{ij}\|^2$$
$$\rho(z_{ij}(p)) = \log\left(1 + \frac{1}{2} z_{ij} i(p)^2\right)$$

N: number of points of measured data
M: number of measured data
$x_i$ is the ith point in the image for which alignment is to be done, and $y_{ij}$ designates the point in the jth measured image that corresponds to $x_i$. The parameter group p comprises the translational motion vector and a quaternion q that represents rotation. The error function is defined as the average of the $\rho(z_{ij}(p))$'s weighted by the M estimation method using a Lorentzian function on the squares of the distances $z_{ij}(p)$ between corresponding points (nearest point). When the gradient for the parameter group p is determined for this error function, it will be as follows:

[Equation 6]

$$\frac{\partial E}{\partial p} = \frac{1}{N(M-1)} \sum_{i}^{N} \sum_{j}^{M} \frac{\partial \rho(z_{ij})}{\partial z_{ij}} \cdot \frac{\partial z_{ij}}{\partial p} \qquad (2)$$

$$= \frac{1}{N(M-1)} \sum_{i}^{N} \sum_{j}^{M} w(z_{ij}) z_{ij} \frac{\partial z_{ij}}{\partial p}$$

where $$w(z_{ij}) = \frac{1}{z_{ij}} \cdot \frac{\partial \rho(z_{ij})}{\partial z_{ij}}$$

Here, if $\delta z_{ij}/\delta p$ is evaluated with the unit quaternion (see non-patent documents 2, 3), the parameter gradient further will be as follows:

[Equation 7]

$$\frac{\partial z_{ij}(p)}{\partial p} = 2(R(q)x_i + m - y_{ij}) \frac{\partial R(q)x_i + m - y_{ij}}{\partial p}\bigg|_{qt} \qquad (3)$$

$$= \begin{bmatrix} 2(x_i + m - y_{ij}) \\ -4x_i \times (m - y_{ij}) \end{bmatrix}$$

For details, see non-patent documents 1, 2, and 3.

In the present invention, the abovementioned $z_{ij}(p)$ was redefined as follows, in consideration of the shape parameters:

$$z_{ij}(p) = |R(q)g(k)_i + m - y_{ij}|^2.$$

Here, k is a shape parameter group, and $g(k)_i$ is the ith point of the ideal data on which alignment is performed. In addition to translational and rotational motion, the distortion g(k) due to the parameters is added to the range image on which alignment is done. At this point, the parameter gradient is as follows:

[Equation 8]

$$\frac{\partial z_{ij}(p)}{\partial p} = 2(R(q)g(k)_i + m - y_{ij})\frac{\partial R(q)g(k)_i + m - y_{ij}}{\partial p}\bigg|_{qt} \quad (4)$$

$$= \begin{bmatrix} 2(g(k)_i + m - y_{ij}) \\ -4g(k)_i \times (m - y_{ij}) \\ 2(g(k)_i + m - y_{ij}))\frac{\partial g(k)_i}{\partial k} \end{bmatrix}$$

The bottom-most row represents the gradient of the newly added shape parameters.

In actuality, in order to perform minimization efficiently, conjugate gradient methods using the Fletcher-Reeves method, or the Polak-Ribiere method (see non-patent documents 4, 5, 6) are used. The amount of motion relative to the direction of the gradient is determined by an enclosure method using the golden section method.

Alignment with Distortion Correction

The following factors can influence the distortion of an image by a balloon in the second measuring system of the present invention.
1. initial velocity of translational motion
2. acceleration of translational motion
3. initial angular velocity of rotational motion
4. angular acceleration of rotational motion In consideration of the fact that the time required for a measuring device in the second measuring system to perform one scan is one second, the acceleration and the angular acceleration within the measuring time can be ignored. Additionally, since minuscule rotational motion can be approximated as translational motion at a constant velocity, in the present specification, only the constant-velocity motion of the balloon within the measuring time shall be considered.

In this case, the three parameters that are the velocities along each axis are optimized. Accordingly, the term g(k), being the shape parameter in equation 4, is replaced with the distortion-corrected term d(v) with the velocity vector v as a parameter.

With the assumptions given above, the parameter gradient $\delta z_{ij}/\delta p$ will be as follows.

[Equation 9]

$$\frac{\partial z_{ij}(p)}{\partial p} = \begin{bmatrix} 2(d(v)_i + m - y_{ij}) \\ -4d(v)_i \times (m - y_{ij}) \\ 2(d(v)_i + m - y_{ij})\frac{\partial d(v)_i}{\partial v} \end{bmatrix} \quad (5)$$

where $d(v)_i = x_i + t_i v$

Here $t_i$ is the amount of time that has passed since the start of scanning, and the distortion-corrected term d is represented by adding the relative displacement from the start of measurement $t_i v$ to the coordinates in the image measured in the second measuring system.

Estimation Experiment Using Actually Measured Data

Actually utilizing an experimental system as described above, measurement was done using a flying range sensor (abovementioned second measuring system) on the Bayon temple in Cambodia. The Bayon temple is a huge temple ruin 100 meters on a side, which is located in the center of Angkor Thom. The experimental data is shown herebelow.

TABLE 1

Experimental Data

| Ground Measuring Device (First Measuring System) | | |
|---|---|---|
| Provided Devices | Device Name | Number |
| Measuring Device | Cyrax 2500 | 2 |

| Aerial Measuring Device (Second Measuring System) | | |
|---|---|---|
| Provided Devices | Device Name or Functional Portion | Number |
| Balloon (Specifications: 4.5 m diameter, maximum lift: 46 kg) | — | 1 |
| Scanner Unit (Aerial Measuring Device) | *Lara 25200, mfg. by Z + F (laser radar unit) | 1 |
| | *Four-faceted polygon mirror | 1 |
| | *Planar swing mirror | 1 |
| Controller Unit | *Radar unit control portion | 1 |
| | *Mirror control portion | 1 |
| | *Interface portion | 1 |
| Measurement Computer (PC + Recording Medium) | — | 1 |

Figure 3:
FIG. 3 shows a diagram where a first image has been obtained based upon the measurement results from the ground by experiment.

FIG. 3 is one portion of a reproduced diagram, having three dimensionally imaged the measurement results from the ground (display is of the view from the point of observation). From the ground, approximately 230 images have been measured using the abovementioned measurement device. There are many unmeasured regions that cannot be observed from the ground, but it can be seen that the main regions within the range visible from the observation position have been measured.

Figure 4:
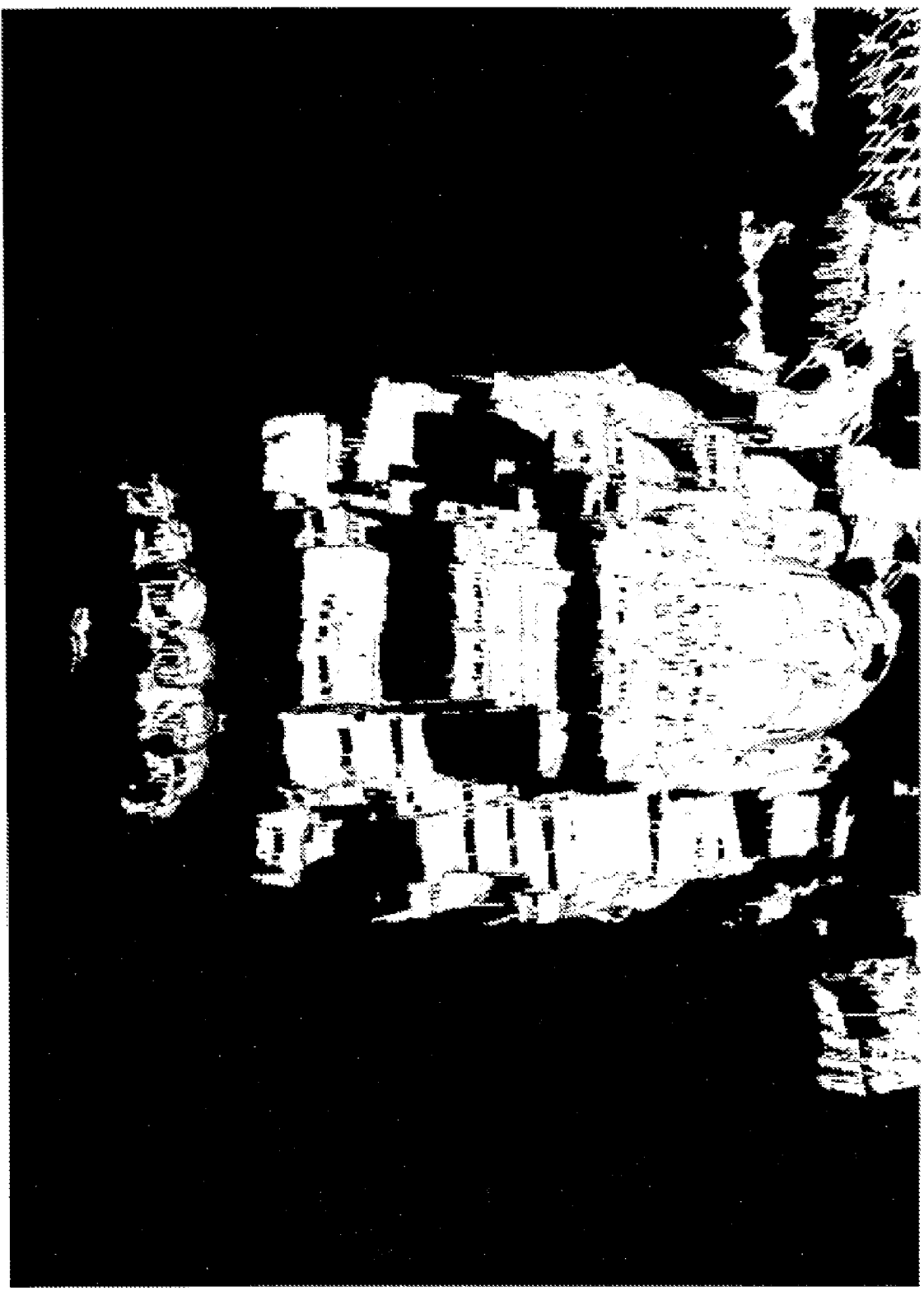
FIG. 4 shows a diagram where a first image has been obtained based upon measurement results from above (high point).
Figure 5:
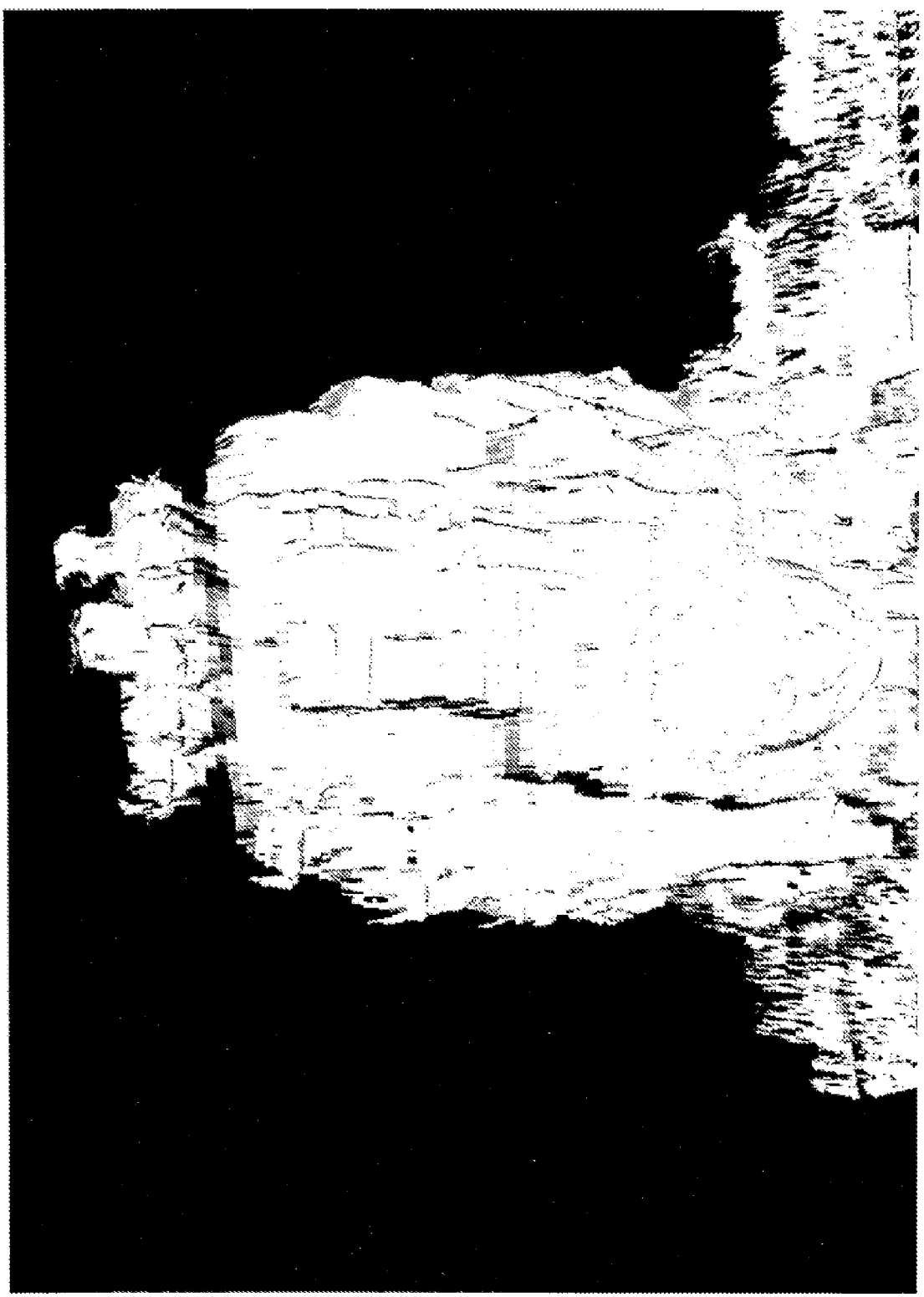
FIG. 5 is a diagram showing a first image to which the results of the flying laser range sensor have been added.

In FIG. 4, it can be seen that many unmeasured regions remain when viewed from different viewing positions (high points in particular). On the other hand, measurement was performed from above using a flying range sensor, and the results of having performed alignment simultaneously with the estimation of the distortion correction parameter as described above are shown in FIG. 5. It can be seen from FIG. 5 that the unmeasured region that cannot be obtained with merely measurement from the ground is accurately filled in by the flying range sensor and distortion correction parameter estimation method. Since the view angle of the flying range sensor of the present invention is narrow, the region that can be obtained in one measurement is small. However, since it is suspended from a balloon, the position of the viewpoint can be readily changed, and since one measurement is completed in one second, it becomes possible to fill in the unmeasured region over a wide range.

Simulation of the Distortion Correction Parameter Estimation Method of the Present Invention The abovementioned simulation experiment by measurement from above shall be explained below.

Two types of shape data that were actually measured by the aforementioned first measuring system were prepared, of which one was artificially distorted and made into data distorted due to measurement from the air (data from the second measuring system), and an experiment was performed using the other type of data as data from the first measuring system (baseline image data).

Figure 8:
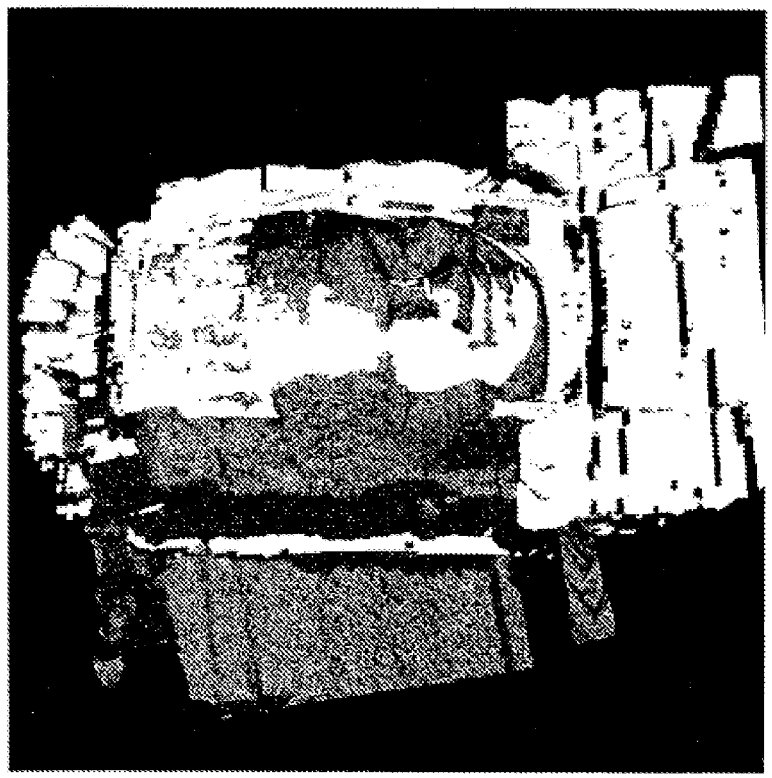
FIG. 8 is the result of having performed the conventional alignment method where it is assumed that the flying range sensor is moving.
Figure 8:
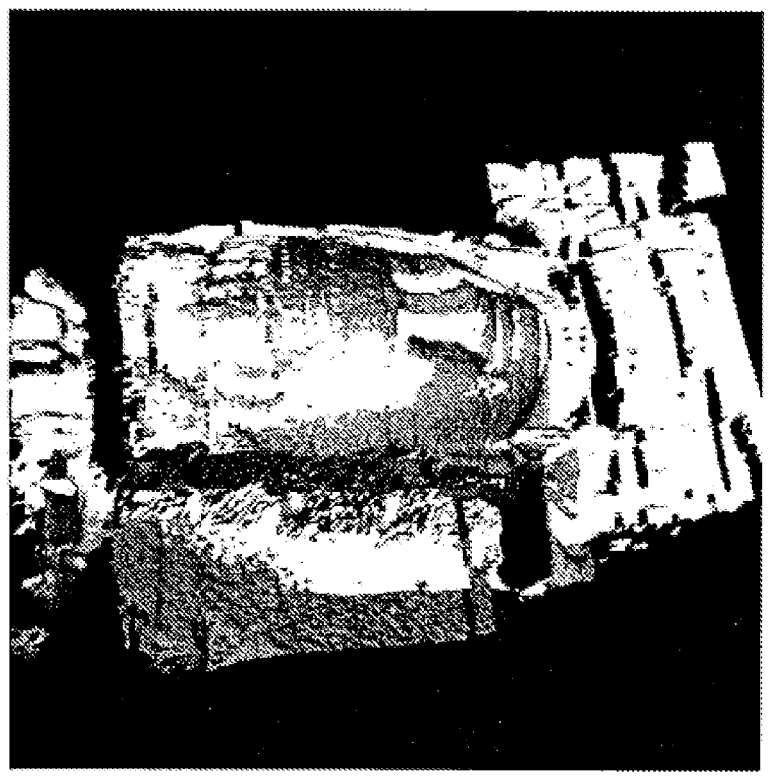

FIG. 8 is the result of having performed the conventional alignment method, assuming that the flying range sensor is changing at a velocity of 0.5 meters per second (lefthand diagram), and 1.0 meters per second (righthand diagram), respectively. From said images, it can be confirmed that a difference in the surface shape clearly arises when the distortion due to changes in the measurement position of the sensor is not taken into consideration.

Figure 7:
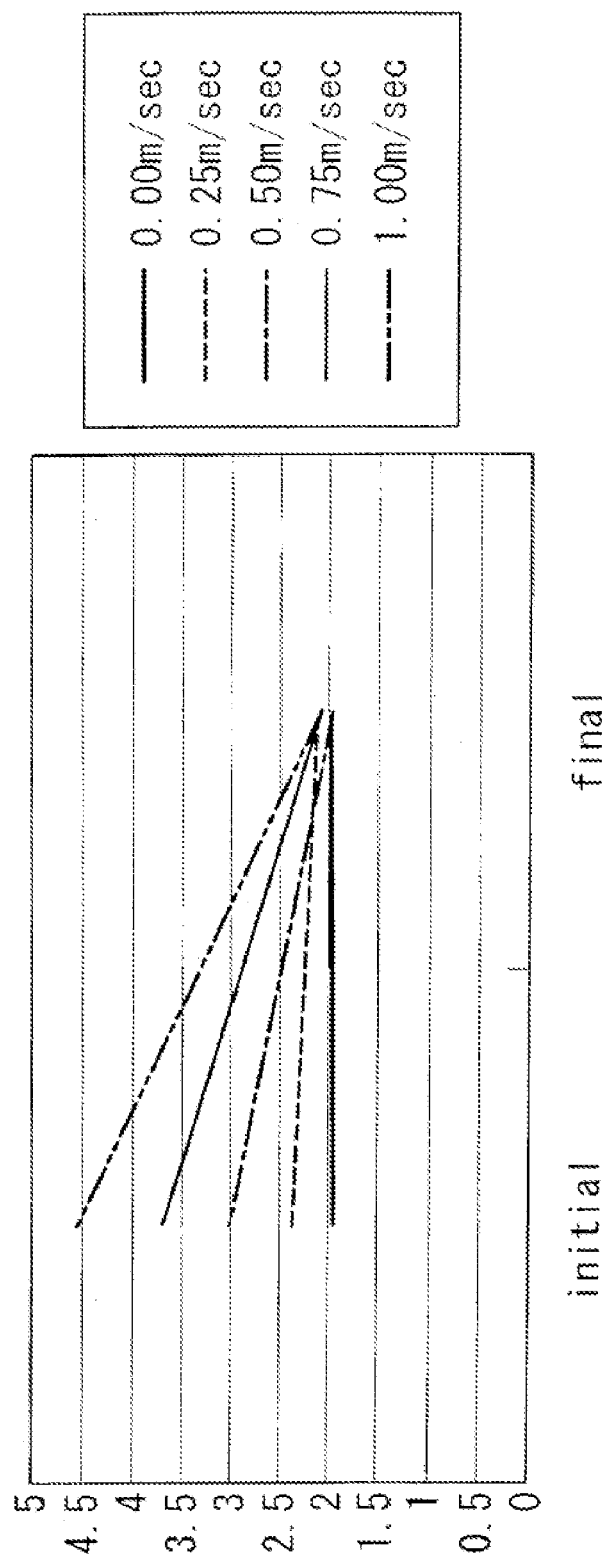
FIG. 7 shows the values of each of the error functions when a simulation experiment was done with the traveling velocity of the sensor changed incrementally between 0 and 1 meter per second.
Figure 9:
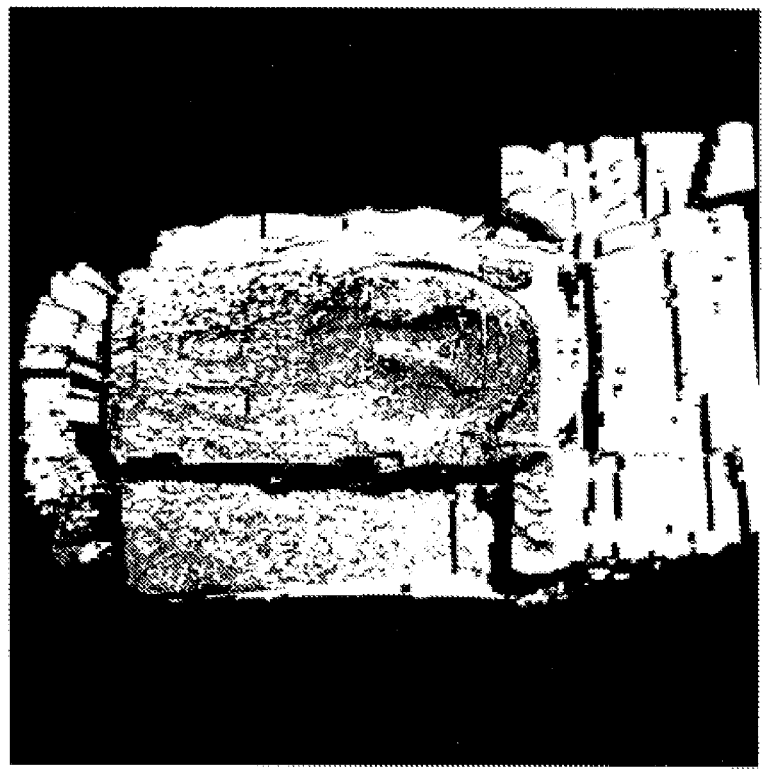
FIG. 9 is the result of correction by estimating the distortion correction parameters according to the methods of the present invention.
Figure 9:
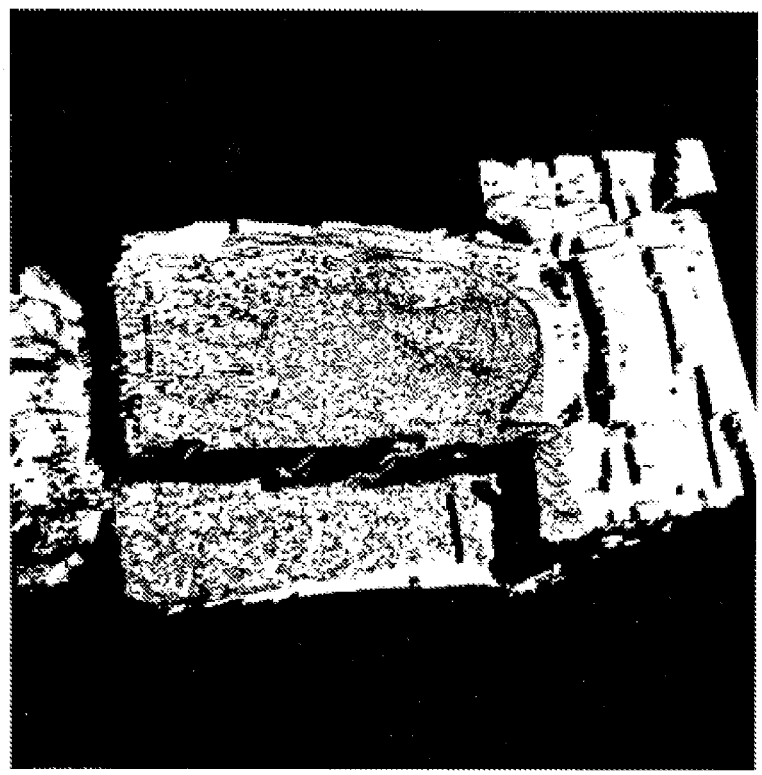

On the other hand, as a result of having performed correction by estimating the distortion correction parameters by the method of the present invention, it can be seen that, as shown in FIG. 9, the distorted shapes are corrected. The traveling velocity of the sensor, at 1.0 meters per second, is a sufficiently large value as a velocity for a sensor being suspended from a balloon and at rest. Additionally, the values of the error function when a simulation experiment was done by increasing the traveling velocity incrementally from 0 meters per second (in this case, the shape did not change) to 1.0 meters per second is shown in FIG. 7. From this result, it can be seen that the values for almost all the velocities converge to values similar to those for a velocity of 0 meters per second. Even in cases where the velocity is 0 meters per second and the shape has not changed, since the shape data on which these are based are different, the error function never converges to 0.

As shown above, the present invention can reproduce the shape of a measured target object with higher accuracy than conventionally, by using three dimensional measurement data obtained by using laser range sensors from two systems, being fixed measurement data and dynamic measurement data from the air. Additionally, in the present specification, the means for suspending the second measuring system in the air is a balloon, but it is obvious to those skilled in the art that the present invention can be applied even if it is suspended using a crane.

The invention claimed is:

1. A system for determining the three dimensional shape of an object, comprising:
   a first measuring device for measuring a first distance and direction from a fixed first observation point to a first group of measurement points on the object, thereby obtaining first measurement results;
   a second measuring device for measuring a second distance and direction from a movable second observation point to a second group of measurement points on the object, thereby obtaining second measurement results, wherein at least one point among said second group of measurement points is a common measurement point, the common measurement point being the same measurement point as at least one point among the first group of measurement points, said second group of measurement points including at least one measurement point not included in the first group of measurement points;
   a computer for:
      (i) calculating a traveling velocity vector of the second observation point from the measurement results concerning the common measurement point made by the first and second measuring devices,
      (ii) correcting the second measurement results based upon said traveling velocity vector, and
      (iii) calculating the three dimensional coordinates of the measurement points of the first group and the second group of measurement points; and
   a display that displays an image of the object based upon the three dimensional coordinates.

2. A system as described in claim 1, characterized in that the second measuring device is provided with a scanner unit comprising a laser radar unit for ranging each point, a four-faceted polygon minor for performing horizontal scanning, and a planar swing mirror for performing vertical scanning.

3. A system as described in claim 2, characterized in that the second measuring device is provided with a controller unit which internally houses a radar unit control portion, control portions for two minors, and an interface portion for sending measurement results to a measuring computer.

4. A system as described in claim 3, characterized in that the second measuring device is provided with a computer having a recording medium that can store measurement results on said recording medium and that can control the a scanner unit and controller unit.

5. A system as described in claim 1, wherein the traveling velocity vector is determined by the conjugate gradient method, with the assumption that the traveling velocity vector is time-independent, using the measurement results concerning the common measurement point, and wherein the measurement result from the second observation point is corrected using said traveling velocity vector.

6. A system as described in claim 5, characterized in that the translational motion vector that minimizes the following equation is determined by the conjugate gradient method:

[Equation 1]

$$E(p) = \frac{1}{N(M-1)} \sum_i^N \sum_j^M \rho(z_{ij}(p))$$

where $$p = (m, q)$$

$$z_{ij}(p) = \|R(q)g(v)i + m - y_{ij}\|^2$$

$$\rho(z_{ij}(p)) = \log\left(1 + \frac{1}{2}z_{ij}i(p)^2\right)$$

N: number of points of measured data

M: number of measured data

E(p) is an error function defined as the weighted average of the $\rho(z_{ij}(p))$'s using the M estimation method with a Lorentzian function;

$$z_{ij}(p) = |R(q)g(v)_i + m - y_{ij}|^2$$

is the distance between corresponding points in the measurement results of the first and the second measuring device;

m is the translational motion vector;

$y_{ij}$ is the corresponding point in the jth measured image;

p is a parameter group comprising the translational motion vector m and a quaternion q that represents rotation;

R(q) is a function of the quaternion q that represents rotation;

g(v)i is a parameter for shape distortion due to uniform velocity motion.

7. A system as described in claim 6, characterized in that a measurement point from the second group of measuring points that is not included in the first group of measurement points is corrected by using m', where m' is the R(q) g(v)$_i$+m that minimizes $z_{ij}(p)$.

8. A system as described in claim 5, wherein the traveling velocity vector includes a rotational component and a horizontal motion component.

9. A method for determining the three dimensional shape of an object, comprising:
   measuring a first distance and direction from a fixed first observation point to a first group of measurement points on the object, thereby obtaining first measurement results;
   measuring a second distance and direction from a movable second observation point to a second group of measurement points on the object, thereby obtaining second measurement results, wherein at least one point among said second group of measurement points is a common measurement point, the common measurement point being the same measurement point as at least one point among the first group of measurement points, wherein said second group of measurement points includes at least one measurement point not included in the first group of measurement points;
   calculating a traveling velocity vector of the second observation point from the measurement results concerning the common measurement point; and
   calculating the three dimensional coordinates of said first group and second group of measurement points by correcting the second measurement results based upon said traveling velocity vector.

10. A method as described in claim 9, where the step of measuring a second distance and direction is carried out with a scanner unit comprising a laser radar unit for performing ranging of each point, a four-faceted polygon minor for performing horizontal scanning, and a planar swing minor for performing vertical scanning.

11. A method as described in claim 10, wherein the step of measuring a second distance and direction includes controlling the scanner unit and control unit with a computer.

12. A method as described in claim 9, where the step of measuring a second distance and direction includes sending measurement results to a measurement computer provided with a recording medium, through an interface.

13. A method as described in claim 9, where the step of measuring a second distance and direction includes saving measurement results to a recording medium with a computer.

14. A method as described in claim 9, wherein the traveling velocity vector is determined by the conjugate gradient method, with the assumption that the traveling velocity vector is time-independent, using the measurement results concerning the common measurement point, and wherein the second measurement results are corrected using said velocity vector.

15. A method as described in claim 14, characterized in that the translational motion vector that minimizes the following equation is determined by the conjugate gradient method:

[Equation 2]

$$E(p) = \frac{1}{N(M-1)} \sum_i^N \sum_j^M \rho(z_{ij}(p))$$

where $$p = (m, q)$$

$$z_{ij}(p) = \|R(q)g(v)i + m - y_{ij}\|^2$$

$$\rho(z_{ij}(p)) = \log\left(1 + \frac{1}{2} z_{ij}i(p)^2\right)$$

N: number of points of measured data
M: number of measured data
E(p) is an error function defined as the weighted average of the $\rho(z_{ij}(p))$'s using the M estimation method with a Lorentzian function;

$$z_{ij}(p) = |R(q)g(v)_i + m - y_{ij}|^2$$

is the distance between corresponding points in the measurement results of the first and the second measuring device;
m is the translational motion vector;
$y_{ij}$ is the corresponding point in the jth measured image;
p is a parameter group comprising the translational motion vector m and a quaternion q that represents rotation;
R(q) is a function of the quaternion q that represents rotation;
g(v)i is a parameter for shape distortion due to uniform velocity motion.

16. A method as described in claim 15, characterized in that a measurement point from the second group of measurement points that is not included in the first group of measurement points is corrected by using m', where m' is the R(q) g(v)$_i$+m that minimizes $z_{ij}(p)$.

17. A method as described in claim 14, wherein the traveling velocity vector includes a rotational component and a horizontal motion component.

* * * * *